United States Patent [19]

Magill

[11] Patent Number: 4,848,656

[45] Date of Patent: Jul. 18, 1989

[54] PROCESS FOR THE CONTROLLED DISPOSAL OF AN AEROSOL CLOUD AND A DEVICE FOR THE IMPLEMENTATION OF THE PROCESS.

[75] Inventor: Joseph Magill, Karlsruhe, Fed. Rep. of Germany

[73] Assignee: European Atomic Energy Community (EURATOM), Luxembourg, Fed. Rep. of Germany

[21] Appl. No.: 198,352

[22] Filed: May 25, 1988

[30] Foreign Application Priority Data

May 26, 1987 [LU] Luxembourg .............................. 86900

[51] Int. Cl.$^4$ ......................... B64D 1/18; E01H 13/00
[52] U.S. Cl. .................................... 239/2.1; 239/14.1; 239/171; 239/123
[58] Field of Search ................... 239/14.1, 2.1, 171, 239/121-123; 244/1 TD, 136; 40/213

[56] References Cited

U.S. PATENT DOCUMENTS

| | | | |
|---|---|---|---|
| 1,284,042 | 11/1918 | Balsillie | 239/2.1 X |
| 1,781,266 | 11/1930 | Bruni | 244/117 R |
| 1,980,171 | 11/1934 | Amy | 239/2.1 |
| 3,429,507 | 2/1969 | Jones | 239/2.1 |
| 3,606,153 | 9/1971 | Boucher . | |
| 3,748,867 | 7/1973 | Belhamri | 239/14.1 X |
| 4,462,483 | 7/1984 | Betts et al. . | |
| 4,475,921 | 10/1984 | Barmatz . | |

FOREIGN PATENT DOCUMENTS

| | | | |
|---|---|---|---|
| 463995 | 7/1928 | Fed. Rep. of Germany | 244/1 TD |
| 445775 | 4/1936 | United Kingdom . | |
| 1154020 | 6/1969 | United Kingdom . | |

OTHER PUBLICATIONS

Article entitled "The Boucher Fog Dispersal System", from Inter—Avia, vol. XII, No. 4, pp. 339-340, 1957.

*Primary Examiner*—Andres Kashnikow
*Assistant Examiner*—Patrick N. Burkhart
*Attorney, Agent, or Firm*—Sughrue, Mion, Zinn, Macpeak & Seas

[57] ABSTRACT

The invention relates to a process for the controlled disposal of an aerosol cloud by means of directed sound waves of high intensity in the audible frequency range. According to the invention, sound waves are emitted by an aircraft (8, 10) operating close to the periphery of the cloud (4). The frequency spectrum of the wave consists of a basic frequency and a superposing frequency of twice the basic frequency valve and phase-shifted in relation to the basic frequency at substantially 90°, so as to cause the particles to coagulate and to migrate towards the sound source, and to be collected at the aircraft.

10 Claims, 1 Drawing Sheet

PROCESS FOR THE CONTROLLED DISPOSAL OF AN AEROSOL CLOUD AND A DEVICE FOR THE IMPLEMENTATION OF THE PROCESS.

FIELD OF THE INVENTION

The invention relates to a process and to a device for the continuous disposal of an aerosol cloud, as well as to the use of this process in the elimination of toxic gases.

BACKGROUND OF THE INVENTION

In known processes, see for example patent document U.S. Pat. No. 3,606,153, unwanted particles in the atmosphere are discarded by physical and/or chemical means and measures, or are eliminated from the field of vision. Among these processes can be cited the technique of irradiation of the particles by means of sonic and ultrasonic waves transmitted from sound sources from the ground or from a ship towards the particle clouds, mostly fog. The purpose of the acoustic irradiation is to densify and coagulate the particles so as to cause them to settle to the ground due to gravity.

The patent document GB-A-1.154.020 describes an ultrasonic siren for use on board of ships, which transmits two acoustic waves of equal frequency within the range of 16 to 22 kHz, which are phase-shifted by 180°. The intensity of the radiation can be variably adjusted.

When fog is irradiated with frequencies in the audible range, very high acoustic field intensities of at least 150 dB are required in order to achieve satisfactory coagulation of the particles.

SUMMARY OF THE INVENTION

It is the aim of the present invention to provide an acoustic irradiation process, which is particularly suited for the disposal of aerosol clouds resulting from the release of radioactive and/or toxic aerosol and gas into the atmosphere in the event of major accidents at nuclear and chemical plants. The resulting danger to human life and the environment due to the atmospheric spreading of such hazardous material over possible hundreds of kilometers can thus be considerably reduced. The invention aims in particular at influencing the particles in such a way that they can be collected. This is not possible in conjunction with the above mentioned known methods.

Consequently, according to the invention, a process for the controlled disposal of an aerosol cloud by means of directed sound waves of high intensity and of frequencies in the audible range is characterized in that the sound waves are emitted by an aircraft operating close to the periphery of the cloud. The frequency spectrum of the wave consists of a basic frequency and a superposed frequency of twice the basic frequency value and phase-shifted by 90° in relation to the basic frequency, so as to cause the particles to coagulate and to migrate towards the sound source, and that the particles are then collected at the aircraft.

With regard to preferred embodiments of the process according to the invention and to the device for implementing this process, reference is made to the subclaims.

Laboratory experiments with smoke have shown that in adopting this kind of irradiation in conjunction with a sufficiently high sound pressure, an intense coagulation of the particles is produced. In addition, the irradiation spectrum induces strong forces on the enlarged particles in the direction of the sound transmitter. For instance, when irradiating a smoke cloud at a distance of 1 m and with a sound pressure of 160 dB, a coagulation of the particles up to a size for the coagulated particles of 60 times the initial one occured within 5 seconds. Drift velocities as high as 1 ms$^{-1}$ can be expected for the enlarged particles based on drift force measurements on 100 $\mu$m diameter particles suspended in the sound field.

This directed fast movement of the coagulated particles is particularly useful in the attack of dangerous aerosol clouds and their controlled disposal, if the sound source and the means for collecting the particles are brought towards the cloud by an aircraft. By this approach, the drawbacks of the known sound transmission techniques operating from the ground or water surface are avoided. These drawbacks mainly consist in that the attacked aerosols can be irradiated from only one direction, i.e. the ground surface, that generally large distances between sound transmitter and cloud have then to be bridged, causing high energy losses in the air, particularly due to acoustic saturation, and that, at best, only an uncontrolled "wash-out" of the aerosols can be realised, which again causes problems in the case of radioactive and toxic aerosols.

When the particle concentration in the cloud is low, it can be advantageous, besides the sound irradiation, to introduce seed aerosols into the cloud to be attacked, and to this effect, an aircraft is again particularly suited.

The aerosol cloud can, of course, also be attacked by more than one aircraft, if necessary of different types, and, in addition, by a stationary or mobile transmitter station on the ground.

DETAILED DESCRIPTION OF THE INVENTION

The invention will now be described in more detail by reference to three figures.

Figure 1:
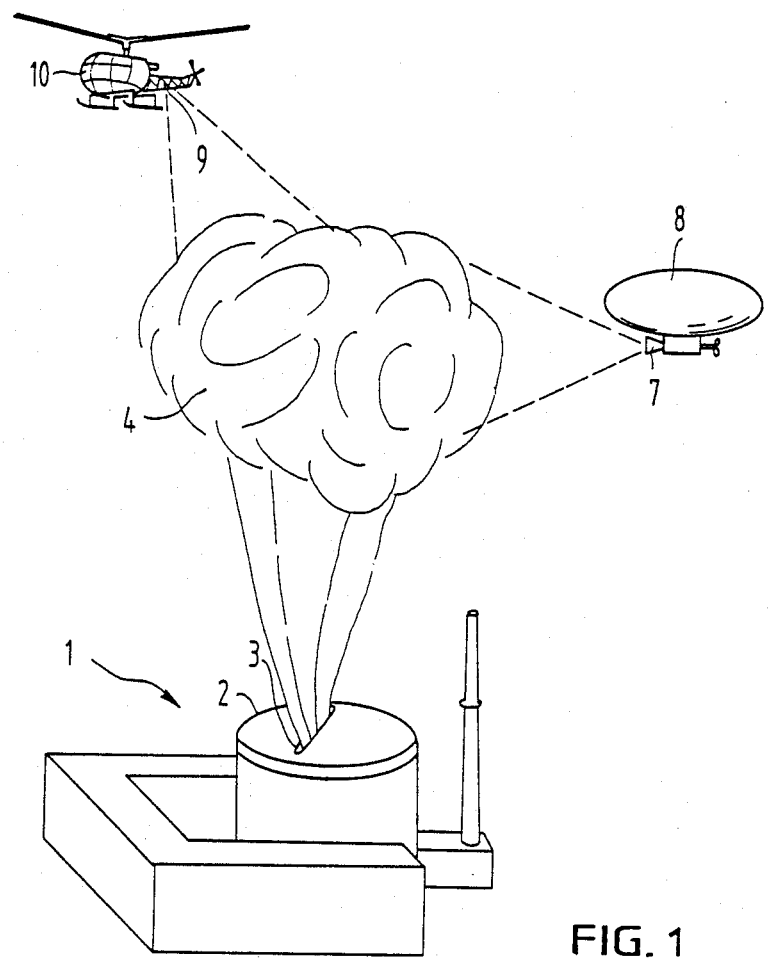

FIG. 1 illustrates an aerosol cloud emerging from a damaged nuclear plane and, schematically, the application of the process according to the invention.

Figure 2:
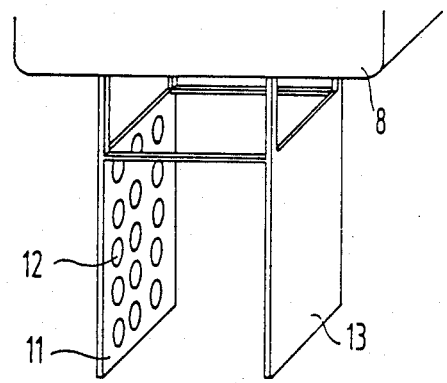

FIG. 2 schematically illustrates a device for the implementation of the process adapted to being fixed to an airship.

Figure 3:
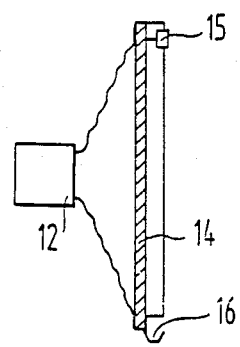

FIG. 3 shows, schematically in cross-section, a sound source including a particle collection device.

An aerosol cloud, such as may be caused by a nuclear accident in a large scale plant, may have the following characteristics:

Diameter of the cloud: 100 meters
Volume of the cloud: $5 \times 10^5 \text{m}^3$
Concentration of particles: $10^{12} \text{m}^{-3}$
Distance between particles: 100 $\mu$m
Mean particle diameter: 1 $\mu$m
Number of particles: $5 \times 10^{17}$
Density of particles: 1 g cm$^{-3}$
Mass loading: 1 g/m$^3$ It can be assumed that the diameter of the particles varies considerably. When the diameter of the particles is smaller than 0.1 $\mu$m, the intermolecular movement already causes the particles to rapidly collide and coagulate with each other. If, however, the diameter of the particles is very large, e.g. larger than 15 $\mu$m, gravity leads to a fast sedimentation of the particles and to their settling on the ground in the immediate vicinity of the damaged plant. Consequently, the particles with diameters between 0.1 and 15 $\mu$m are particularly dangerous, because they are carried far away by the atmospheric movements, and must be treated by the process according to the invention.

In order to understand the interaction between a sound wave and such particles, it is necessary to take into account the mass of the particles: Small particles behave like gas particles in a sound wave and are carried away by it. For heavier particles, inertia effects attenuate the movement of the particle. The movement of such particles thus decreases with increasing mass or increasing frequency of the sound wave. At a given sound frequency, particles with different masses move with very different speed, so that the particles collide and coagulate. It is thus possible, as is known, to increase the size of a particle in an aerosol by the impact of sound waves with sufficient intensity and adequate frequency, so that the particles "rain off"]the cloud by gravity and do not propagate farther away with the atmospheric currents.

Now, the invention adds a further step by preventing the aerosols from falling to the ground due to the creation of drift movement of the particles towards the sound source and to the collection of the particles in a collection device fixed to the aircraft. The forces responsible for the overall coagulation and drifting process are the average Stokes force and the average Oseen force.

The Stokes force originates from the viscosity of a fluid which depends on temperature. With an adiabatic compression of the fluid, caused by a sound wave, the temperature of the fluid first increases and then decreases again in the second half-cycle of the sound wave. The product of fluid speed times viscosity yields an average value over a cycle, which generates a drift of the particles in the direction of the sound source. It can be demonstrated that in air at 20° C. and at atmospheric pressure, a sound wave having a pressure value of 151 dB is able to establish a drift of 0.66 cm/s.

In addition, the so-called Oseen force becomes effective. This force is for instance defined in the Journal of the Acoustic Society of America, Vol. 22, 1950, p. 319 ff. and Vol. 23, 1951, pp 312-315. It originates from the distortion of the wave shape at higher amplitudes and is independent of the temperature variation in the sound wave. On the contrary, the value and the direction of this force depend upon the degree of distortion, particularly upon the phase shift between the basic frequency and the double of the base frequency, provided the sound wave contains particularly these components. This force is highest towards the source for a phase difference of +90° between these components.

Practical embodiments of the process according to the invention and of the devices needed for its implementation are now described with reference to the drawings.

FIG. 1 shows a nuclear power plant 1 comprising a reactor enclosure 2, which has a crack 3 in its roof because of an accident. Radioactive substances escape through this crack and form an aerosol cloud 4 in the surrounding air with the above mentioned characteristics. The propagation of the radioactive particles through atmospheric movements is to be prevented by the invention.

The attack of the cloud and its disposal is demonstrated here for the case of two aircrafts, namely an airship 8 and a helicopter 10. Both crafts are equipped with a sound transmitter, e.g. a siren 7 respectively 9 for radiating the sound signals according to the invention, the irradiated space being marked by the dotted lines. In the place of a single siren, a matrix arrangement of transducer-controlled loudspeakers 12 may be provided, as can be seen schematically in FIG. 2.

A remotely controlled aircraft may also be flown directly into the cloud, so that the effects of coagulation and drifting will become even more intense than in the case of irradiating the cloud from its periphery.

The effect of the sound is particularly intense, when the particles in the aerosol cloud are exposed to a field of stationary sound waves. This can be achieved, as shown in FIG. 2, for a sound emitter device equipped with loudspeakers 12 in a matrix structure 11, if a reflection wall 13 is mounted in juxtaposition to the structure 11, leaving a distance in between. The wall 13 as well as the structure 11 are of course fixed to the airship 8. The structure 11 may, when used with an aircraft, be provided with fewer sirens than when used with ground stations. The distance between the reflection wall 13 and the structure 11 may for instance amount to 10 m. With a drift speed of 20 cm per second, the space volume between the matrix structure 11 and the reflection wall 13 would be 'cleaned' within some seconds, so that the airship may be moved slowly within the cloud for treating the various portions of the cloud. It should be also noted that an airship offers the advantage of being able to drift with the wind, while in the cloud, without further steering means.

In FIG. 3, there is shown, in a cross-sectional view, a single arrangement operating simultaneously as a loudspeaker and as a collection device, in which sound energy is transformed from electrical energy. In front of the sound producing membrane of the loudspeaker 12, there is disposed a reception wall 14 permeable to sound, upon which impact the drifting particles and which constitutes, in conjunction with a vertically mobile wiper 15, a collecting device for the arriving particles. The wiper is moved periodically across the surface and conveys the particles into a collecting groove 16, from whereon they are discharged or sucked off.

As has already been mentioned, the average Oseen-force generates particularly high drift speeds, if the sound waves contain, according to the invention, a basic frequency (e.g. 20 kHz) and a first harmonic (40 kHz) phase-shifted by 90°, as being the main components of the transmission spectrum. Such a spectrum may be produced for instance by electrically controlled piezo-electric or magneto-strictive converters. Also, acoustic transducers have been developed more recently which transform up to 80% of the input electrical power into acoustic power. But also whistles or sirens or combustion engines operating as sound sources may be applied in the process according to the invention, provided the sound power is high enough.

The invention is not limited to the treatment of radioactive aerosol clouds, but may be employed in all situations where undesired aerosol clouds are to be eliminated from the atmosphere. This is particularly true in case of chemical accidents, traffic accidents with tank trucks or in conjunction with the treatment of ground fog banks in airfield areas.

When especially a gas cloud is to be attacked and eliminated, the cloud may be pre-treated by means of injecting see particles like activated carbon or zeolite. the adsorption of the gas by the carbon or zeolite particles is enhanced when the intensity of the sound field is high by the destruction of the viscous boundary layer around the particle. Then, the seed particles together with the adsorbed gas molecules are 'sucked' by the sound source in the above explained way.

Also, when the mass loading of a particle cloud to be attacked falls or is below 1 g/m$^3$, spraying of seed particles into the cloud is to be recommended, in order to reactivate the coagulation effect or to bring it about.

A seed aerosol which is easy to be produced is smoke from burning automobile tyres. Burning tyre rubber produces a dense black smoke, which not only increases the total mass loading of the cloud, but also enables the optical observation of the movement of the cloud and of the efficiency of the sound attack. There are species of rubber which produce, while burning, amounts of water vapour, whereby the efficiency of the acoustic coagulation process is further increased. If, for instance, 5% of an amount of rubber optimized with regard to the density and diameter of the smoke particles were converted into aerosol particles, it would be possible to create a mass loading of 1 gm$^{-3}$ in a volume of $5 \times 10^5$ m$^3$ with an amount $10^4$ kg of rubber, to be stored near the place of the endangered nuclear or chemical plant.

Another appropriate aerosol is fine water mist or water vapour. The spray devices are not shown in the drawings since they are of any conventional type.

Principally, frequencies in the range of 100 Hz to 50 kHz apply to the process according to the invention. The lower the frequencies, the lower the absorption of the sound energy by the surrounding air. Because, however, of the close range type attack of the aerosol cloud by means of aircraft, the use of frequencies higher than 20 kHz is possible.

I claim:

1. A process for the controlled disposal of an aerosol cloud by means of directed sound waves of high intensity and of frequencies in the audible range, characterized in that the sound waves are emitted by an aircraft (8, 10) operating close to the periphery of the cloud (4), the frequency spectrum of the wave consists of a basic frequency and a superposed frequency of twice the basic frequency value and phase-shifted by 90° in relation to the basic frequency, so as to cause the particles to coagulate and to migrate towards the sound source, and that the particles are then collected at the aircraft.

2. A process according to claim 1, characterized in that in addition seed particles are injected into the aerosol cloud, such that coagulation is facilitated.

3. A process according to claim 2, characterized in that, for the disposal of a gas cloud, simultaneously seed particles are injected into the gas cloud and sound waves are impacting upon the cloud, whereby the adsorption of the gas molecules to the particles is enhanced.

4. A device for the implementation of the process according to claim 1, characterized in that the aircraft operating close to or within the cloud is equipped with at least one sound transmitter (7, 9, 12) and with means (14 to 16) for collecting the coagulated particles.

5. A device according to claim 4, characterized in that the aircraft operating close to or within the cloud is equipped with means, e.g. a spray device, for introducing seed particles into the cloud.

6. A device according to claim 4, characterized in that a plurality of synchroneously operated sound transmitters (12) is mounted side by side on a matrix structure (11) fixed to the aircraft (8, 10).

7. A device according to claim 4, characterized in that each sound transmitter (12) cooperates with a reflector (13), which is adjustably mounted opposite the transmitter, in order to generate a stationary sound wave.

8. A device according to claim 5, characterized in that a plurality of synchroneously operated sound transmitters (12) is mounted side by side on a matrix structure (11) fixed to the aircraft (8, 10).

9. A device according to claim 5, characterized in that each sound transmitter (12) cooperates with a reflector (13), which is adjustably mounted opposite the transmitter, in order to generate a stationary sound wave.

10. A device according to claim 6, characterized in that each sound transmitter (12) cooperates with a reflector (13), which is adjustably mounted opposite the transmitter, in order to generate a stationary sound wave.

* * * * *